United States Patent
Backman et al.

(10) Patent No.: US 9,794,852 B2
(45) Date of Patent: Oct. 17, 2017

(54) ROUTING AN IP SESSION OVER WLAN

(71) Applicant: TELEFONAKTIEBOLAGET L M ERICSSON (PUBL), Stockholm (SE)

(72) Inventors: Jan Backman, Kärna (SE); Dinand Roeland, Sollentuna (SE); Stefan Rommer, Västra Frölunda (SE); Daniel Nilsson, Älvängen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 71 days.

(21) Appl. No.: 14/599,080

(22) Filed: Jan. 16, 2015

(65) Prior Publication Data

US 2015/0208317 A1    Jul. 23, 2015

(30) Foreign Application Priority Data

Jan. 20, 2014   (EP) ..................................... 14151786

(51) Int. Cl.
*H04W 40/02*    (2009.01)
*H04W 8/26*    (2009.01)
(Continued)

(52) U.S. Cl.
CPC ............. *H04W 40/02* (2013.01); *H04L 45/74* (2013.01); *H04L 61/106* (2013.01);
(Continued)

(58) Field of Classification Search
None
See application file for complete search history.

(56) References Cited

U.S. PATENT DOCUMENTS

2008/0192925 A1* 8/2008 Sachs .................. H04L 12/5692
380/29
2011/0317558 A1* 12/2011 Siddam ................. H04W 28/16
370/235
(Continued)

FOREIGN PATENT DOCUMENTS

EP       2075959 A1    7/2009
EP       2166735 A1    3/2010
(Continued)

OTHER PUBLICATIONS

3GPP TR 23.852, 3rd Generation Partnership Project; Technical Specification Group Services and System Aspects; Study on S2a Mobility based on GTP & WLAN access to EPC (SaMOG); Stage 2 (Release 12); Sophia-Antipolis Cedex, France, Jul. 20, 2012.
(Continued)

*Primary Examiner* — Anh Ngoc Nguyen
(74) *Attorney, Agent, or Firm* — Patent Portfolio Builders, PLLC

(57) ABSTRACT

The present disclosure relates to a method performed by a network element in a communication network for routing an IP session to a radio device over a WLAN, the IP session comprising at least one bearer. The method comprises obtaining an identifier for each of the at least one bearer of the IP session. The method also comprises mapping downlink data packets of the IP session to the identifier for each of the at least one bearer of the IP session. The method also comprises transmitting each of the DL packets on a bearer of said at least one bearer, together with the identifier for the bearer it has been mapped to, over the WLAN to the radio device. The disclosure also relates to a network element and a radio device, as well as to other methods thereof.

10 Claims, 6 Drawing Sheets

(51) Int. Cl.
*H04L 12/741* (2013.01)
*H04L 29/08* (2006.01)
*H04W 84/12* (2009.01)
*H04L 29/12* (2006.01)
*H04W 76/02* (2009.01)

(52) U.S. Cl.
CPC ............. *H04L 69/327* (2013.01); *H04W 8/26* (2013.01); *H04W 76/022* (2013.01); *H04W 84/12* (2013.01); *H04L 61/2038* (2013.01); *H04L 61/6022* (2013.01); *H04W 76/021* (2013.01); *H04W 76/025* (2013.01)

(56) References Cited

U.S. PATENT DOCUMENTS

| | | | |
|---|---|---|---|
| 2013/0308531 A1* | 11/2013 | So | H04W 76/022 370/328 |
| 2014/0071925 A1* | 3/2014 | Liu | H04W 28/08 370/329 |

FOREIGN PATENT DOCUMENTS

| | | |
|---|---|---|
| EP | 2709418 A1 | 3/2014 |
| WO | 2011157129 A2 | 12/2011 |
| WO | 2012149400 A2 | 11/2012 |
| WO | 2013121492 A1 | 8/2013 |
| WO | 2013144714 A2 | 10/2013 |
| WO | 2014107358 A1 | 7/2014 |

OTHER PUBLICATIONS

CR 1188 to TS 23.402, SA WG2 Meeting #99, Introduction of eSaMOG: overall description; Sep. 23-27, 2013, Xiamen, China.
3GPP TS 23.402 V12.3.0 (Dec. 2013), 3rd Generation Partnership Project; Technical Specification Group Services and System Aspects; Architecture enhancements for non-3GPP accesses (Release 12), Valbonne, France.
EP office action in application No. 14151786.2 mailed Aug. 5,2016, 10 pages.
China Mobile et al: "SaMOG User plane Description", 3rd Generation Partnership Project, F-06921, S2-133588, Sep. 26, 2013 (Sep. 26, 2013), XP050726925.

* cited by examiner

ROUTING AN IP SESSION OVER WLAN

This application claims the benefit of European Patent Application No. 14/151786.2, filed Jan. 20, 2014, the disclosure of which is fully incorporated herein by reference.

TECHNICAL FIELD

The present disclosure relates to methods and devices for routing an internet protocol (IP) session of a telecommunication standard over a wireless local area network (WLAN) radio access network (RAN).

BACKGROUND

The third generation partnership project (3GPP) defines the concept of bearers. A bearer uniquely identifies traffic flows that receive a common quality of service (QoS) between a user equipment (UE) and a packet data network (PDN) gateway (PGW).

The currently standardized bearer mechanism is using bearers in the General Packet Radio Service (GPRS) tunnelling protocol (GTP) interface between the Trusted WLAN Access Network (TWAN) gateway (TWAG) and PGW but between UE and the TWAN there is only one pipe. This results in that for uplink (UL) traffic the TWAN has to classify the uplink traffic and send it on the correct bearer.

FIG. 1 is a schematic block diagram illustrating evolved packet core (EPC and evolved packet system (EPS) concepts, which are also defined in the 3GPP technical specifications (TS) 23.401 and 23.402. The figure explains the bearer concept over a 3GPP radio interface. It is noted that each PDN connection contains at least one bearer. That bearer is called default bearer. Additional bearers within that same PDN connection are called dedicated bearers. The PDN is an IP network such as the Internet or an intranet e.g. a service network. The PGW is a functional node providing access for one or more UE to one or more PDNs. The PDN connection provides a UE with an access channel to a PDN. It is a logical tunnel between UE and PGW. Each PDN connection has a single IP address or prefix. A UE can set up multiple PDN connections, possibly to the same Access Point Name (APN), a string containing the name of the PDN. The PDN connection between the PGW and the UE is further illustrated as containing a plurality of EPS bearers (three in FIG. 1). Each EPS bearer is defined by a set of IP flows with the same QoS profile. Each EPS bearer runs end-to-end (e2e) between the UE and the PGW but is a concatenation of an S5 GTP tunnel between the PGW and a serving gateway (SGW), an S1 GTP tunnel between the SGW and an evolved Node B (eNB), and a radio bearer between the eNB and the UE.

In 3GPP release 11 (Rel-11), the bearer concept is only partially implemented over Wi-Fi, since the EPS bearer concept does not exist over WLAN. FIG. 2 illustrates this. The PGW communicates via the S2a interface between the PGW and a TWAG, comprising or being associated with an access controller (AC). A PDN connection contains one or more S2a bearers (three in FIG. 2, between the PGW and the TWAG). S2a supports the bearer concept in that each bearer is a GTP tunnel. Also here there is a PDN connection between the UE and the PGW. However, WLAN does not support the bearer concept. Thus, the S2a bearer is not e2e between the UE and PGW as in access via a cellular 3GPP standard (illustrated in figure i). Instead, each PDN connection is a logical concatenation of one or more 52a tunnels between the PGW and the TWAG and a single L2 point-to-point link between the TWAG and the UE.

Different virtual media access control (MAC) addresses may be used for identifying different PDN connections over WLAN. The functional architecture is shown in FIGS. 3 and 4, where FIG. 3 illustrates the functional S2a based architecture in a non-roaming scenario and FIG. 4 illustrates the functional split of the TWAN, and where FIG. 4 zooms in what is denoted as the Trusted WLAN Access Network (TWAN) in FIG. 3. See TS 23.402 for a further clarification of this architecture. 3GPP Rel-12 allows a UE to setup multiple PDN connections over WLAN. Each PDN connection is identified by a (virtual) MAC address of the TWAG. A change request (CR) 1188 to TS 23.402, incorporated in version 12.3.0 of TS 23.402, describes how (real or virtual) MAC addresses are used to differentiate PDN connections from each other. Still, the bearer concept is not introduced over WLAN, therefore it is not possible to establish multiple bearers within the WLAN segment of the PDN connection. As a consequence, each PDN connection has a single pipe over the WLAN.

SUMMARY

It has been realised that it would be convenient to use the bearer concept also between the TWAG and the UE, i.e. over the WLAN. Thus, a bearer identity is defined for identification of each of the bearers between the TWAG and the UE. Without this identity the TWAN will have to classify the uplink traffic and send it on the correct bearer on the S2a interface.

According to an aspect of the present disclosure, there is provided a method performed by a network element in a communication network for routing an IP session to a radio device over a WLAN, the IP session comprising at least one bearer. The method comprises obtaining an identifier for each of the at least one bearer of the IP session. The method also comprises mapping downlink data packets of the IP session to the identifier for each of the at least one bearer of the IP session. The method also comprises transmitting each of the DL packets on a bearer of said at least one bearer, together with the identifier for the bearer it has been mapped to, over the WLAN to the radio device.

According to another aspect of the present disclosure, there is provided a computer program product comprising computer-executable components for causing a network element to perform an embodiment of a method of the present disclosure when the computer-executable components are run on processor circuitry comprised in the network element.

According to another aspect of the present disclosure, there is provided a network element for a communication network for routing an IP session to a radio device over a WLAN, the IP session comprising at least one bearer. The network element comprises processor circuitry, and a storage unit storing instructions that, when executed by the processor circuitry, cause the network element to obtain an identifier for each of the at least one bearer of the IP session. The instructions also cause the network element to map downlink (DL) data packets of the IP session to the identifier for each of the at least one bearer of the IP session. The instructions also cause the network element to transmit each of the DL packets on a bearer of said at least one bearer, together with the identifier for the bearer it has been mapped to, over the WLAN to the radio device.

According to another aspect of the present disclosure, there is provided a method performed by a radio device in a communication network for routing an IP session over a WLAN, the IP session comprising at least one bearer. The method comprises obtaining an identifier for each of the at least one bearer of the IP session. The method also comprises mapping uplink (UL) data packets of the IP session to the identifier for each of the at least one bearer of the IP session. The method also comprises transmitting each of the UL packets on a bearer of said at least one bearer, together with the identifier for the bearer it has been mapped to, over the WLAN.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a radio device for a communication network for routing an IP session over a WLAN, the IP session comprising at least one bearer. The radio device comprises processor circuitry, and a storage unit storing instructions that, when executed by the processor circuitry, cause the radio device to obtain an identifier for each of the at least one bearer of the IP session. The instructions also cause the radio device to map UL data packets of the IP session to the identifier for each of the at least one bearer of the IP session. The instructions also cause the radio device to transmit each of the UL packets on a bearer of said at least one bearer, together with the identifier for the bearer it has been mapped to, over the WLAN.

According to another aspect of the present disclosure, there is provided a method performed by a network element in a communication network for routing an IP session from a radio device over a WLAN, the IP session comprising at least one bearer. The method comprises obtaining an identifier for each of the at least one bearer of the IP session. The method also comprises mapping UL data packets of the IP session to the at least one bearer based on the identifier for each of the at least one bearer. The method also comprises transmitting each of the UL packets on the bearer which it has been mapped to.

According to another aspect of the present disclosure, there is provided a network element for a communication network for routing an IP session from a radio device over a WLAN, the IP session comprising at least one bearer. The network element comprises processor circuitry, and a storage unit storing instructions that, when executed by the processor circuitry, cause the network element to obtain an identifier for each of the at least one bearer of the IP session. The instructions also cause the network element to map UL data packets of the IP session to the at least one bearer based on the identifier for each of the at least one bearer. The instructions also cause the network element to transmit each of the UL packets on the bearer which it has been mapped to.

By using a different identifier, e.g. a real or virtual MAC address, for each of the bearers in an IP session, e.g. over a PDN connection, the bearer concept can be applied also over WLAN in accordance with the present disclosure. For instance, instead of assigning a virtual MAC address per PDN connection, each bearer gets assigned a virtual MAC address. By doing this, the concept of bearers as they are implemented in 3GPP networks can be extended to cover also the link between the radio device, e.g. UE, and TWAN.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In standardization of WLAN access in 3GPP, support for bearers between TWAG and PGW (sea interface) has been defined. There is however no solution for how to extend those bearers to the radio device/UE. In accordance with embodiments of the present disclosure MAC addresses e.g. virtual MAC-addresses (vMAC) are used as the way of distinguishing between different bearers over the WELAN interface. There is currently ongoing standardization work in 3GPP to use vMAC for separating PDN connections between UE and TWAG. The vMAC is assigned by a new non-access stratum (NAS) protocol Wireless LAN Control Protocol (WLCP) to be defined by 3GPP. Instead, in accordance with the present disclosure, a dedicated virtual MAC address can be assigned per bearer. Embodiments of the present disclosure using vMAC as bearer identifier allows for one-to-one mapping to the bearers without changing the underlying transport over WLAN between the radio device and the network element, e.g. TWAG. If a new identifier would have been used, it would be necessary to add that to the already standardized frame format between the radio device and the TWAG. It should here be noted that the use of vMAC is only an example of an identifier for each bearer, other examples including real MAC addresses and VLAN IDs. Also, embodiments of the present disclosure may be relevant also for other IP sessions than a PDN connection.

It may also be possible to add support for Traffic Flow Template (TFT), which is an IP packet filter that is used to define what traffic that qualifies to be transported over a specific bearer. With that in place, it may be possible to combine the QoS concept for WLAN with QoS bearers for 3GPP accesses, by allowing the 3GPP connection to still be active when WLAN access with handover support over the s2a reference point is used. There are thus additional advantages with different embodiments of the present disclosure.

Figure 1:
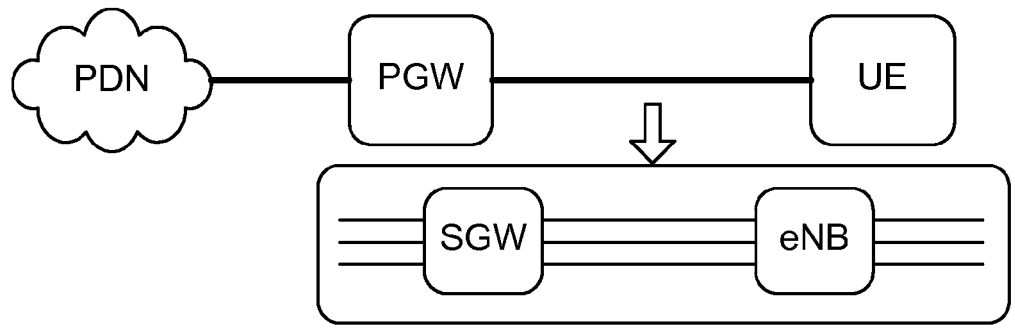
FIG. 1 is a schematic block diagram illustrating EPC/EPS in accordance with prior art.
Figure 2:
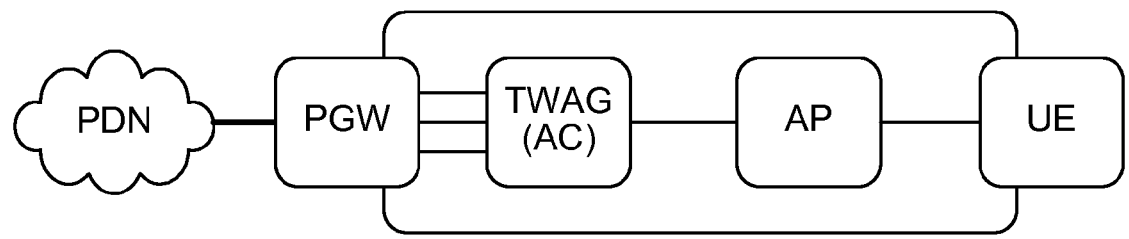
FIG. 2 is a schematic block diagram illustrating EPC/EPS when used together with a WLAN RAN in accordance with prior art.
Figure 3:
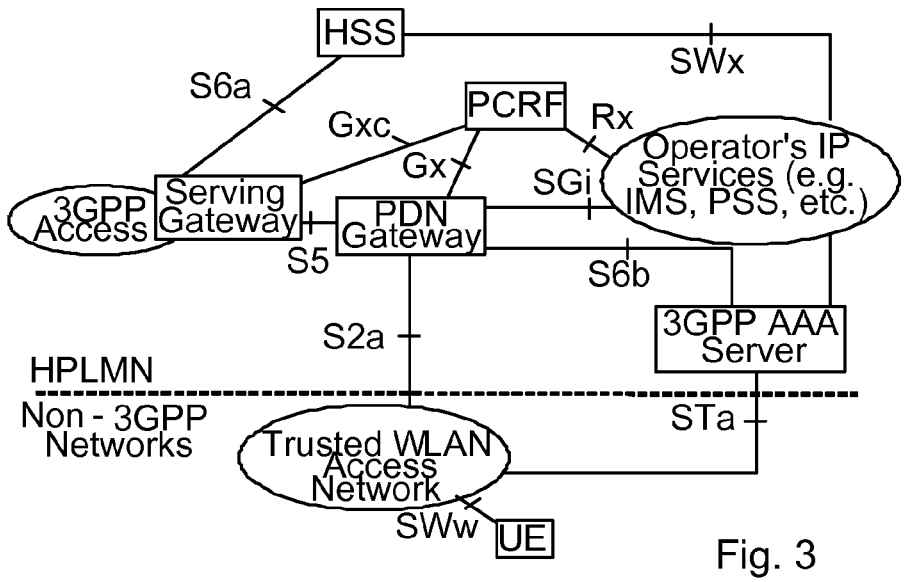
FIG. 3 is a schematic block diagram of a core network cooperating with a TWAN in accordance with prior art.
Figure 4:
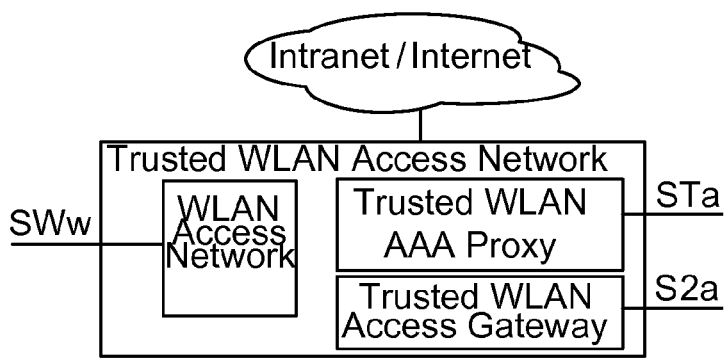
FIG. 4 is a schematic block diagram of a TWAN in accordance with prior art.
Figure 5:
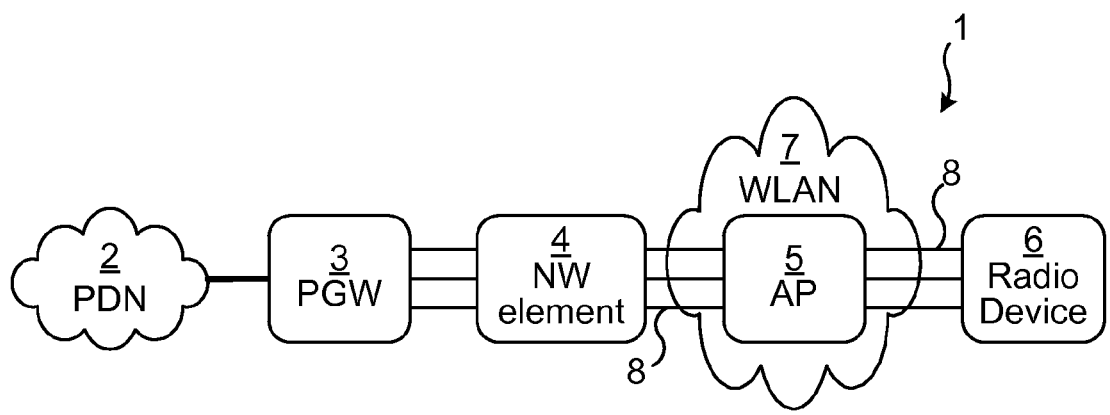
FIG. 5 is a schematic block diagram of an embodiment of a communication network in accordance with the present disclosure.

FIG. 5 is a schematic block diagram of an embodiment of a communication network 1 in accordance with the present disclosure. A PDN 2 is in communication in an IP session with a radio device 6 over a WLAN 7. For the IP session, three bearers 8, e.g. EPS bearers, are set up between a PGW 3 and the radio device 6, via a network element (NW element) 4, e.g. a TWAG, and an access point (AP) 5 of the WLAN 7. Thus, the NW element 4 is logically positioned between the PGW 3 and the AP 5. In contrast to the prior art discussed above, the bearers 8 are thus set up e2e between the PGW 3 and the radio device 6 and the TWAG need not route all data packages over a single pipe over the WLAN RAN.

Figure 6:
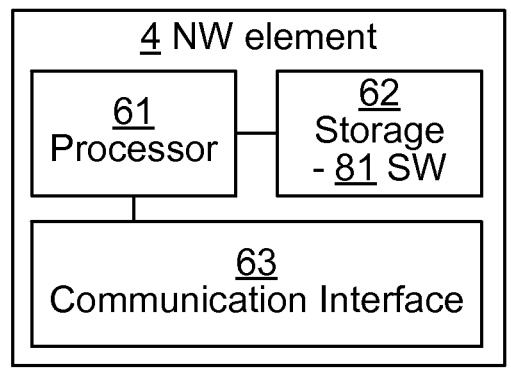
FIG. 6 is a schematic block diagram of an embodiment of a network element in accordance with the present disclosure.

FIG. 6 is schematic block diagram of an embodiment of a network element 4 in accordance with the present disclosure. The NW element 4, or a part thereof, may e.g. be or be part of a TWAG or an AC, or at least partly be or be part of a node separate from the TWAG or AC. The NW element 4 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software 81 (see also FIG. 8) stored in a storage 62 of one or several storage unit(s) e.g. a memory. The storage unit is regarded as a computer readable means 82 (see FIG. 8) as discussed herein and may e.g. be in the form of a Random Access Memory (RAM), a Flash memory or other solid state memory, or a hard disk, or be a combination thereof. The processor circuitry 61 is also configured to store data in the storage 62, as needed. The NW element 4 also comprises a communication interface 63, e.g. comprising a transmitter and a receiver which may be combined to form a transceiver or be present as distinct units. The communication interface 63 is configured to cooperate with the processor circuitry 61 to transform data bits to be transmitted to a suitable signal. Similarly, the communication interface 63 is configured to cooperate with the processor circuitry 61 to transform a received signal to data bits.

Figure 7:
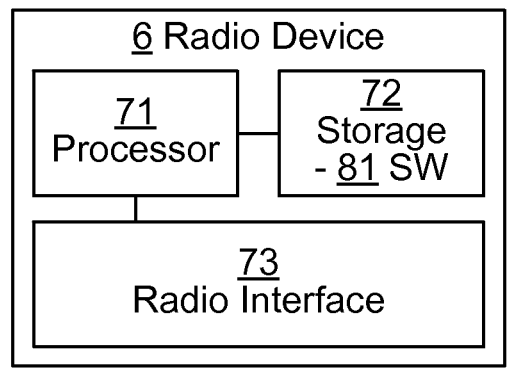
FIG. 7 is a schematic block diagram of an embodiment of a radio device in accordance with the present disclosure.

FIG. 7 is a schematic block diagram of an embodiment of a radio device 6 in accordance with the present disclosure. The radio device 6 may be any device or user equipment (UE), mobile or stationary, enabled to communicate over a radio cannel in a communications network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). The radio device 6 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software 81 (see also FIG. 8) stored in a storage 72 of one or several storage unit(s) e.g. a memory. The storage unit is regarded as a computer readable means 82 (see FIG. 8) as discussed herein and may e.g. be in the form of a Random Access Memory (RAM), a Flash memory or other solid state memory, or a hard disk, or be a combination thereof. The processor circuitry 71 is also configured to store data in the storage 72, as needed. The radio device 6 also comprises a radio communication interface 73, e.g. comprising a receiver, a transmitter and an antenna, which may be combined to form a transceiver or be present as distinct units. The radio interface 73 is configured to cooperate with the processor circuitry 71 to transform data bits to be transmitted over an air interface to a suitable radio signal in accordance with the WLAN RAN via which the data bits are to be transmitted. Similarly, the radio interface 73 is configured to cooperate with the processor circuitry 71 to transform a received radio signal to data bits.

Figure 8:
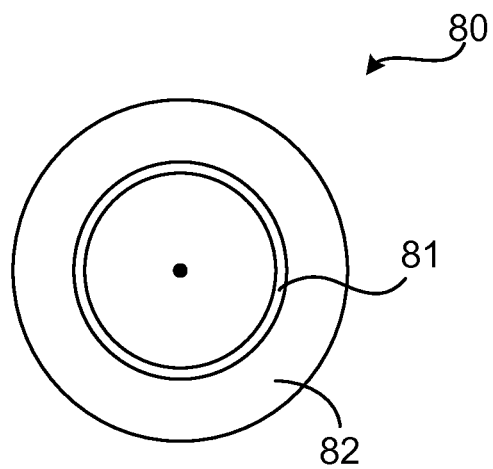
FIG. 8 is a schematic illustration of an embodiment of a computer program product in accordance with the present disclosure.

FIG. 8 illustrates a computer program product 80. The computer program product 80 comprises a computer readable medium 82 comprising a computer program 81 in the form of computer-executable components 81. The computer program/computer-executable components 81 may be configured to cause a NW element 4 or a radio device 6, e.g. as discussed herein, to perform an embodiment of a method of the present disclosure. The computer program/computer-executable components may be run on the processor circuitry 61/71 of the element/device 4/6 for causing it to perform the method. The computer program product 80 may e.g. be comprised in a storage unit or memory 62/72 comprised in the element/device 4/6 and associated with the processor circuitry 61/71. Alternatively, the computer program product 80 may be, or be part of, a separate, e.g. mobile, storage means, such as a computer readable disc, e.g. CD or DVD or hard disc/drive, or a solid state storage medium, e.g. a RAM or Flash memory.

Figure 9:
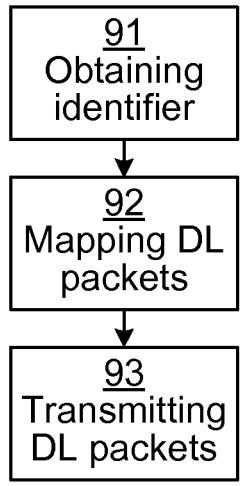
FIG. 9 is a schematic flow chart of an embodiment of a method performed by a network element in accordance with the present disclosure.

FIG. 9 is a schematic flow chart of an embodiment of a method performed by a network element 4 in accordance with the present disclosure. The NW element 4 is in a communication network 1 and the method is for routing an IP session, e.g. a PDN connection, to a radio device 6 over a WLAN 7. The IP session comprises at least one bearer 8, typically a plurality of bearers 8. An identifier for each of the at least one bearer 8 of the IP session is obtained 91. Thus, if the IP session comprises a plurality of bearers 8, each of those bearers has a different identifier which is obtained 91 by the NW element 4. The NW element may e.g. obtain 91 the identifier(s) from its storage 62 or from a message received from outside of the NW element 4. As discussed herein, the identifier may e.g. be a vMAC. DL data packets of the IP session are mapped to the identifier for each of the at least one bearer of the IP session. For instance, DL packets comes from a plurality of PGW to TWAG GTP tunnels, each having a different tunnel ID. In the DL the NW element 4, e.g. TWAG, adds an Ethernet header with the identifier, e.g. vMAC, obtained 91 to each packet coming from a specific tunnel, and the procedure is repeated for each of the tunnels. Thus, a plurality of bearers are defined by means of being associated with different identifiers, e.g. vMAC, when transmitted over the WLAN 7. Each of the DL packets is transmitted 93 on a bearer 8 of said at least one bearer, together with the identifier for the bearer it has been mapped 92 to, over the WLAN 7 to the radio device 6. Thus, the DL packet is transmitted together with the identifier it has been mapped 92 to, e.g. in its Ethernet header, on the bearer 8 for which said identifier has been obtained 91.

Figure 10:
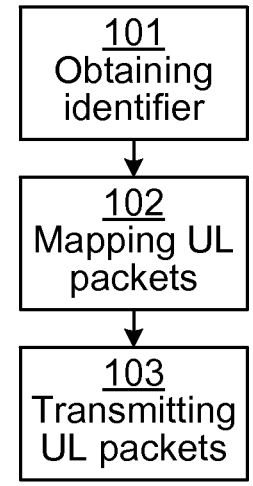
FIG. 10 is a schematic flow chart of an embodiment of a method performed by a radio device in accordance with the present disclosure.

FIG. 10 is a schematic flow chart of an embodiment of a method performed by a radio device 6 in accordance with the present disclosure. The radio device is in a communication network 1 and the method is for routing an IP session, e.g. a PDN connection, over a WLAN 7. The IP session comprises at least one bearer 8, typically a plurality of bearers 8. An identifier for each of the at least one bearer 8 of the IP session is obtained 101. Thus, if the IP session comprises a plurality of bearers 8, each of those bearers has a different identifier which is obtained 101 by the radio device 6. The radio device 6 may e.g. obtain 101 the identifier(s) from its storage 72 or from a message received from outside of the radio device 6. As discussed herein, the identifier may e.g. be a vMAC. UL data packets of the IP session are mapped 102 to the at least one bearer 8 based on the identifier for each of the at least one bearer. Thus, since each of the bearers 8 is associated with its own identifier differentiating it from the other bearers, the radio device 6 may e.g. add the proper identifier to an Ethernet header of each UL packet, thereby defining the different bearers of the IP session. Thus, a plurality of bearers are defined by means of being associated with different identifiers, e.g. vMAC, when transmitted over the WLAN 7. Each of the UL packets is transmitted 103 on a bearer 8 of said at least one bearer, together with the identifier for the bearer it has been mapped 102 to, over the WLAN 7 e.g. to/via the NW element 4. Thus, the UL packet is transmitted on the bearer 8 it has been mapped 102 to, together with the identifier of the bearer it has been mapped 102 to.

Figure 11:
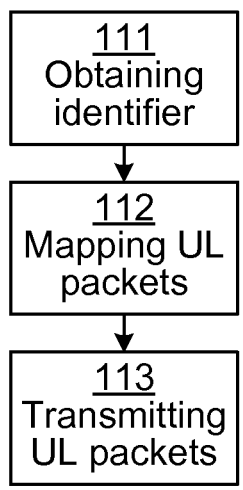
FIG. 11 is a schematic flow chart of an embodiment of another method performed by a network element in accordance with the present disclosure.

FIG. 11 is a schematic flow chart of an embodiment of a method performed by a network element 4 in accordance with the present disclosure. The NW element 4 is in a communication network 1 and the method is for routing an IP session, e.g. a PDN connection, from a radio device 6 wherein the radio device 6 transmits over a WLAN 7 for the IP session. The IP session comprises at least one bearer 8, typically a plurality of bearers 8. An identifier for each of the at least one bearer 8 of the IP session is obtained in. Thus, if the IP session comprises a plurality of bearers 8, each of those bearers has a different identifier which is obtained in by the NW element 4. The NW element 4 may e.g. obtain in the identifier(s) from its storage 62 or from a message received from outside of the NW element 4. As discussed herein, the identifier may e.g. be a vMAC. UL data packets of the IP session are mapped to the at least one bearer (8) based on the identifier for each of the at least one bearer. For instance, UL packets comes from a plurality of bearers 8 defined by means of being associated with different identifier e.g. added to an Ethernet header of each of the packets by the radio device 6. The NW element 4, e.g. a TWAG, may then map 112 each of the packets to each of the bearers 8 for the section of the bearers between the NW element 4 and the PGW, e.g. corresponding to TWAG to PGW GTP tunnels each having a different tunnel ID. Each of the UL packets is transmitted 93 on the bearer 8 which it has been mapped 112 to, e.g. to a PGW 3.

In some embodiments of the present disclosure the at least one bearer 8 is a plurality of bearers, and the obtaining 91 of an identifier comprises obtaining a different identifier for each of the plurality of bearers 8. Thus, there is a plurality of bearers in the IP session and each has a unique (among the plurality of bearers) identifier.

In some embodiments of the present disclosure the identifier is a media access control (MAC) address or a virtual local area network (VLAN) identification (ID). Herein MAC addresses are much discussed as an example of the identifiers, but other identifiers are also possible, e.g. VLAN IDs. Preferably the identifier is a MAC address such as a virtual MAC address (vMAC).

In some embodiments of the present disclosure the obtaining 91 or 101 an identifier comprises the NW element 4 selecting and assigning an identifier for each of the at least one bearer 8. This implies that the identifier(s) is actively assigned to each of the at least one bearers, instead of e.g. receiving data packets with identifiers already assigned to bearer(s).

In some embodiments of the present disclosure the network element 4 is an access controller (AC), wherein the AC is comprised in, or otherwise associated with, a TWAG. It may be convenient to include the functionality of the NW element 4 in an AC and/or a TWAG.

In some embodiments of the present disclosure the network element 4 is in the IP session logically situated between a PGW 3 and a WLAN AP 5.

In some embodiments of the present disclosure the obtaining 101 an identifier comprises the radio device 4 receiving the identifier in a message D or f from the network element 4 in the communication network 1.

EXAMPLES

The following, different signalling diagrams are used to explain example embodiments of the present disclosure in more detail. Note that using WLCP for setting up bearers within a PDN connection has not been specified yet so the names of messages are just assumptions or suggestions.

The bearer 8 has a corresponding user plane and control plane TEID both on the PGW and TWAN side. The TWAN will then send information about this PDN connection/bearer to the radio device 6 using WLCP. Also in the WLCP message there may be a TFT filter that instruct the radio device 6 what traffic to send on that particular bearer 8. Also, to get proper QoS, a differentiated services code point (DSCP) value and/or WLAN access may be assigned to the bearer 8 (mapped from QoS class identifier (QCI) over S2a). When the radio device 6 sends an uplink packet matching the TFT, the destination MAC address may be equal to vMAC of the bearer 8. When TWAN sends a downlink packet on this bearer to the radio device 6, the vMAC is used as source MAC address.

Example 1

Figure 12:
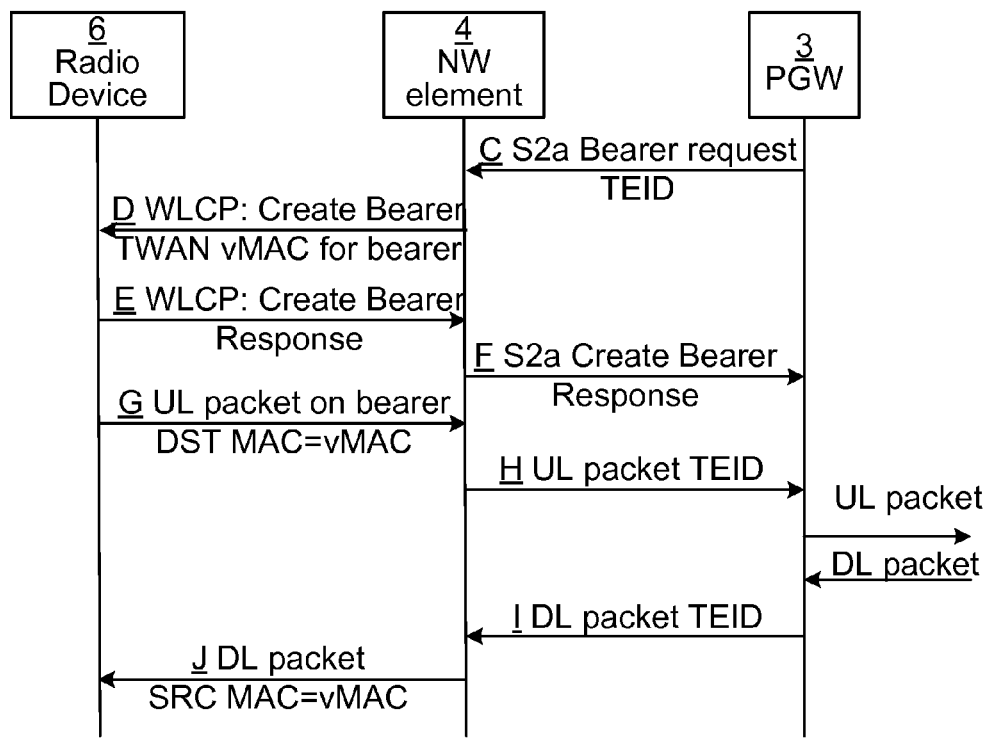
FIG. 12 is a schematic signalling diagram of an embodiment of a method in accordance with the present disclosure in which the network sets up a bearer in an IP session.

The first signalling diagram of FIG. 12 illustrates a network initiated creation of a dedicated bearer 8 over WLAN 7. The network initiates the creation of a dedicated bearer 8 on an existing PDN connection. A new vMAC, at least unique for that UE, is assigned to the bearer. First the bearer is set up, after which the bearer 8 is used for transmission of UL and DL data packets. The example signalling sequence is as follows.

A Bearer Request C is sent from the PGW 3 to the NW element 4 over the S2a interface with a Tunnel Endpoint Identifier (TEID).

A Create Bearer message D of WLCP with a TWAN vMAC for the bearer is sent from the NW element 4 to the radio device 6.

A Create Bearer Response E of WLCP is sent from the radio device 6 to the NW element 4.

A Create Bearer Response F is sent over the S2a interface from the NW element 4 to the PGW 3.

An UL message G with an UL packet is transmitted with the vMAC (as destination MAC address, DST MAC) for the bearer on said bearer from the radio device 6 to the NW element 4.

An UL message H with the UL packet is transmitted with the TEID from the NE element 4 to the PGW 3 which may then transmit the UL packet further.

After having received a DL data packet, the PGW 3 transmits a DL message I with the DL data packet and the TEID to the NW element 4.

A DL message J with the DL data packet is transmitted with the vMAC (as source MAC address, SRC MAC) for the bearer on said bearer from the NW element 4 to the radio device 6.

Example 2

Figure 13:
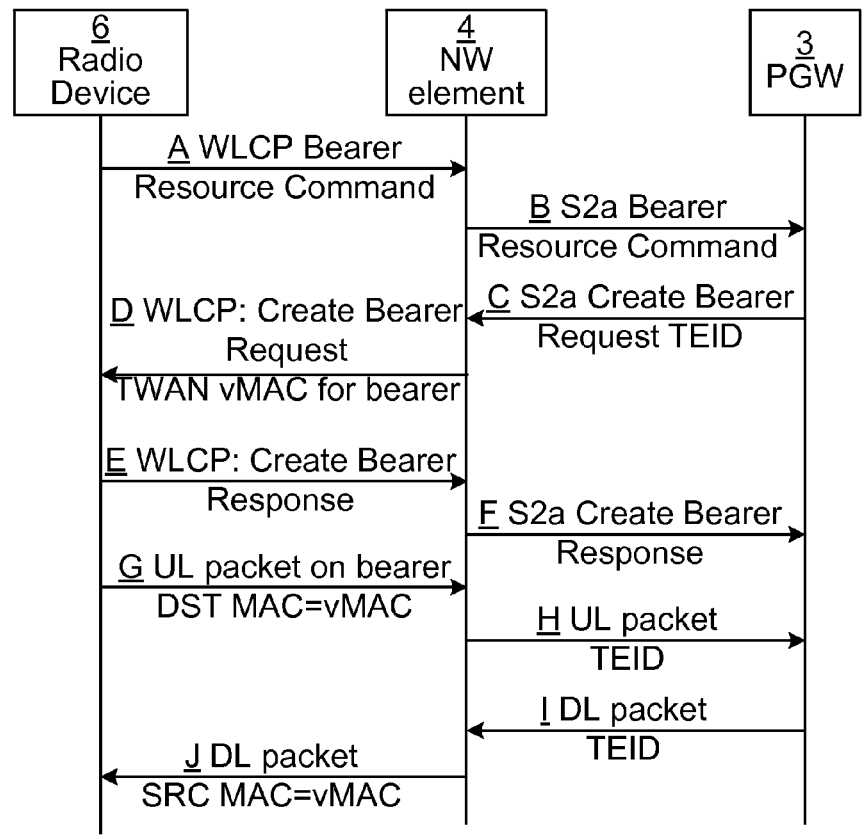
FIG. 13 is a schematic signalling diagram of an embodiment of a method in accordance with the present disclosure in which the radio device sets up a bearer in an IP session.

The second signalling diagram of FIG. 13 illustrates a radio device initiated creation of a dedicated bearer 8 over WLAN 7. The radio device 6 initiates the creation of a dedicated bearer 8 on an existing PDN connection. A new vMAC, at least unique for that UE, is assigned to the bearer. The radio device commands the network to set up the bearer, after which the signalling sequence is as in FIG. 12 of example 1. First the bearer is set up, then the bearer 8 is used for transmission of UL and DL data packets. The example signalling sequence is as follows.

A Bearer Resource Command A of WLCP is transmitted from the radio device 6 to the NW element 4.

A Bearer Resource Command B is transmitted over the S2a interface from the NW element 4 to the PGW 3.

A Bearer Request C is sent from the PGW 3 to the NW element 4 over the S2a interface with a Tunnel Endpoint Identifier (TEID).

A Create Bearer message D of WLCP with a TWAN vMAC for the bearer is sent from the NW element 4 to the radio device 6.

A Create Bearer Response E of WLCP is sent from the radio device 6 to the NW element 4.

A Create Bearer Response F is sent over the S2a interface from the NW element 4 to the PGW 3.

An UL message G with an UL packet is transmitted with the vMAC (as destination MAC address, DST MAC) for the bearer on said bearer from the radio device 6 to the NW element 4.

An UL message H with the UL packet is transmitted with the TEID from the NE element 4 to the PGW 3 which may then transmit the UL packet further.

After having received a DL data packet, the PGW 3 transmits a DL message I with the DL data packet and the TEID to the NW element 4.

A DL message J with the DL data packet is transmitted with the vMAC (as source MAC address, SRC MAC) for the bearer on said bearer from the NW element 4 to the radio device 6.

Example 3

Figure 14:
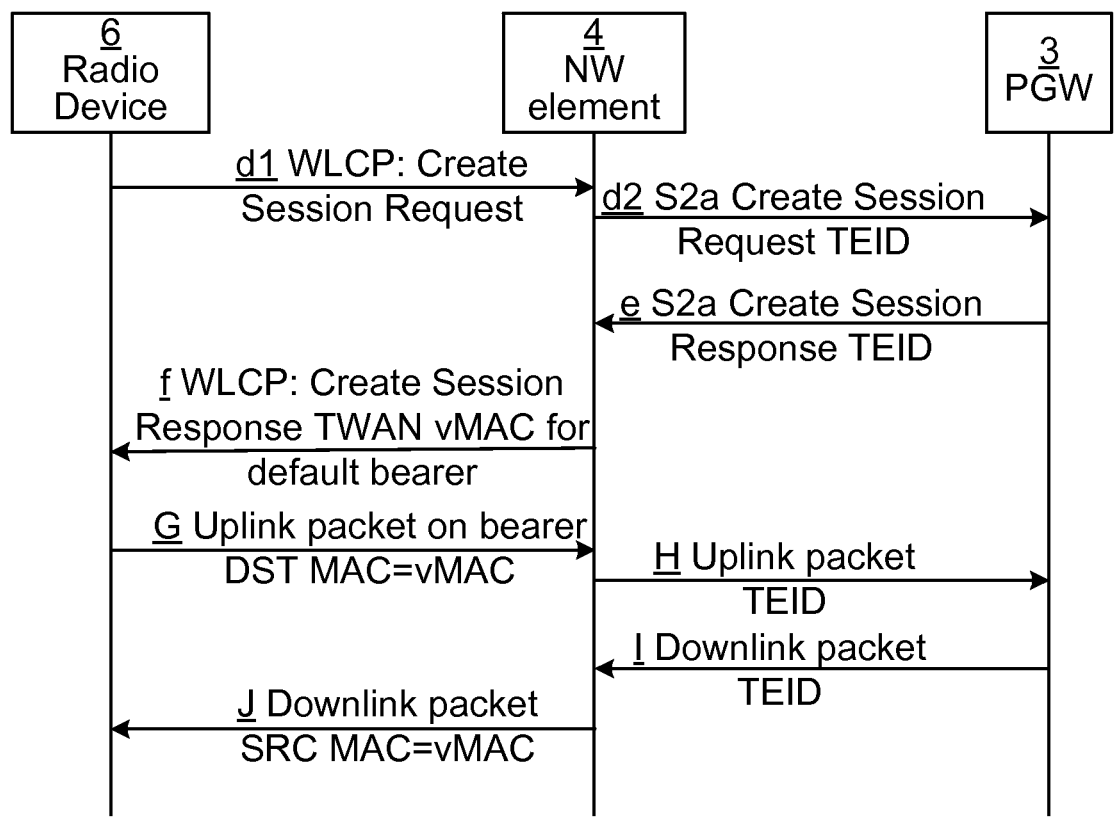
FIG. 14 is a schematic signalling diagram of an embodiment of a method in accordance with the present disclosure in which the network element sets up an IP session.

The third signalling diagram of FIG. 14 illustrates an initial attach to create an IP session over WLAN 7. First the radio device 6 authenticates, typically using EAP-SIM (Extensible Authentication Protocol (EAP), Subscriber Identity Module (SIM))/Authentication and Key Agreement (AKA) or AKA'. Then an S2a session is created with the default bearer between the TWAN (as an example of the NW element 4) and PGW 3. The example signalling sequence is as follows.

A Create Session Request d1 is transmitted in WLCP from the radio device 6 to the NW element 4.

A Create Session Request d2 is transmitted over the S2a interface with TEID from the NW element 4 to the PGW 3.

A Create Session Response e is transmitted over the S2a interface with TEID from the PGW 3 to the NW element 4.

A Create Session Response f is transmitted in WLCP with TWAN vMAC for a default bearer 8.

An UL message G with an UL packet is transmitted with the vMAC (as destination MAC address, DST MAC) for the bearer on said bearer from the radio device 6 to the NW element 4.

An UL message H with the UL packet is transmitted with the TEID from the NE element 4 to the PGW 3 which may then transmit the UL packet further.

After having received a DL data packet, the PGW 3 transmits a DL message I with the DL data packet and the TEID to the NW element 4.

A DL message J with the DL data packet is transmitted with the vMAC (as source MAC address, SRC MAC) for the bearer on said bearer from the NW element 4 to the radio device 6.

Below follow some other aspects of the present disclosure.

According to an aspect of the present disclosure, there is provided a network element 4 for a communication network 1 for routing an IP session to a radio device 6 over a WLAN 7, the IP session comprising at least one bearer 8. The network element comprises means (e.g. the processor circuitry 61, possibly in cooperation with the storage unit 62 and/or the communication interface 63) for obtaining 91 an identifier for each of the at least one bearer 8 of the IP session. The network element also comprises means (e.g. the processor circuitry 61) for mapping 92 DL data packets of the IP session to the identifier for each of the at least one bearer of the IP session. The network element also comprises means (e.g. the processor circuitry 61 in cooperation with the communication interface 63) for transmitting 93 each of the DL packets on a bearer of said at least one bearer 8, together with the identifier for the bearer it has been mapped 92 to, over the WLAN 7 to the radio device 6.

According to another aspect of the present disclosure, there is provided a radio device 6 for a communication network 1 for routing an IP session over a WLAN 7, the IP session comprising at least one bearer 8. The radio device comprises means (e.g. the processor circuitry 71, possibly in cooperation with the storage unit 72 and/or the communication interface 73) for obtaining 101 an identifier for each of the at least one bearer 8 of the IP session. The radio device also comprises means (e.g. the processor circuitry 71) for mapping 102 UL data packets of the IP session to the at least one bearer 8 based on the identifier for each of the at least one bearer. The radio device also comprises means (e.g. the processor circuitry 71 in cooperation with the communication interface 73) for transmitting 103 each of the UL packets on a bearer of said at least one bearer 8, together with the identifier for the bearer it has been mapped 102 to, over the WLAN 7.

According to another aspect of the present disclosure, there is provided a network element 4 for a communication network 1 for routing an IP session from a radio device 6 over a WLAN 7, the IP session comprising at least one bearer 8. The network element comprises means (e.g. the processor circuitry 61, possibly in cooperation with the storage unit 62 and/or the communication interface 63) for obtaining 111 an identifier for each of the at least one bearer 8 of the IP session. The network element also comprises means (e.g. the processor circuitry 61) for mapping 112 UL data packets of the IP session to the at least one bearer (8) based on the identifier for each of the at least one bearer. The network element also comprises means (e.g. the processor circuitry 61 in cooperation with the communication interface 63) for transmitting 113 each of the UL packets on the bearer 8 which it has been mapped 112 to.

According to another aspect of the present disclosure, there is provided a computer program 81 for a network element 4 in a communication network 1 for routing an IP session to a radio device 6 over a WLAN 7, the IP session comprising at least one bearer 8. The computer program 81 comprises computer program code which is able to, when run on processor circuitry 61 of the network element 4, cause the network element to obtain 91 an identifier for each of the at least one bearer 8 of the IP session. The code is also able to cause the network element to map 92 DL data packets of the IP session to the identifier for each of the at least one bearer of the IP session. The code is also able to cause the network element to transmit 93 each of the DL packets on a bearer of said at least one bearer 8, together with the identifier for the bearer it has been mapped to, over the WLAN 7 to the radio device 6.

According to another aspect of the present disclosure, there is provided a computer program 81 for a radio device 6 in a communication network 6 for routing an IP session over a WLAN 7, the IP session comprising at least one bearer 8. The computer program comprises computer program code which is able to, when run on processor circuitry 71 of the radio device, cause the radio device 6 to obtain 101 an identifier for each of the at least one bearer 8 of the IP session. The code is also able to cause the radio device 6 to map 102 UL data packets of the IP session to the identifier for each of the at least one bearer 8 of the IP session. The code is also able to cause the radio device 6 to transmit 103 each of the UL packets on a bearer of said at least one bearer 8, together with the identifier for the bearer 8 it has been mapped to, over the WLAN 7.

According to another aspect of the present disclosure, there is provided a computer program 81 for a network element 4 in a communication network 1 for routing an IP session to a radio device 6 over a WLAN 7, the IP session comprising at least one bearer 8, the computer program 81 comprising computer program code which is able to, when run on processor circuitry 61 of the network element 4, cause the network element to obtain ill an identifier for each of the at least one bearer 8 of the IP session. The code is also able to cause the network element to map 112 UL data packets of the IP session to the at least one bearer 8 based on the identifier for each of the at least one bearer. The code is also able to cause the network element to transmit 113 each of the UL packets on the bearer 8 which it has been mapped 112 to.

According to another aspect of the present disclosure, there is provided a computer program product 80 comprising an embodiment of a computer program 81 of the present disclosure and a computer readable means 82 on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network element in a communication network for routing a data packet of an Internet Protocol, IP, session to a radio device over a wireless local area network, WLAN, the IP session comprising at least one bearer, the method comprising:
    obtaining an identifier for each of the at least one bearer of the IP session, wherein obtaining the identifier comprises obtaining a different identifier for each of the at least one bearer, and wherein each of the at least one bearer of the IP session is set up end-to-end between a packet data network, PDN, gateway, PGW, and the radio device;
    mapping downlink, DL, data packets of the IP session to the corresponding identifier for each of the at least one bearer of the IP session; and
    transmitting each of the DL data packets on a bearer of the at least one bearer, together with the corresponding identifier for the bearer it has been mapped to, over the WLAN to the radio device.

2. The method of claim 1, wherein the at least one bearer is a plurality of bearers.

3. The method of claim 1, wherein the identifier corresponding to each of the at least one bearer is a media access control, MAC, address or a virtual local area network, VLAN, identification, ID.

4. The method of claim 1, wherein the obtaining the identifier comprises selecting and assigning the identifier for each of the at least one bearer.

5. The method of claim 1, wherein the network element is a trusted WLAN access gateway, TWAG, or an access controller, AC.

6. The method of claim 1, wherein the network element is an access controller, AC, and wherein the AC is associated with a trusted WLAN access gateway, TWAG.

7. The method of claim 1, wherein the network element is, in the IP session, situated between the PGW and a WLAN access point, AP.

8. The method of claim 1, wherein the IP session is over a PDN connection comprising the at least one bearer.

9. A non-transitory computer readable medium comprising computer-executable components for causing the network element to perform the method of claim 1 when the computer-executable components are run on processor circuitry comprised in the network element.

10. A network element for a communication network for routing a data packet of an Internet Protocol, IP, session to a radio device over a wireless local area network, WLAN, the IP session comprising at least one bearer, the network element comprising:

processor circuitry; and a storage unit storing instructions that, when executed by the processor circuitry, cause the network element to:
   obtain a different identifier for each of the at least one bearer of the IP session, wherein each of the at least one bearer of the IP session is set up end-to-end between a packet data network, PDN, gateway, PGW, and the radio device;
   map downlink, DL, data packets of the IP session to the corresponding identifier for each of the at least one bearer of the IP session; and
   transmit each of the DL data packets on a bearer of the at least one bearer, together with the corresponding identifier for the bearer it has been mapped to, over the WLAN to the radio device.

\* \* \* \* \*